(12) United States Patent
Santais et al.

(10) Patent No.: US 7,165,956 B2
(45) Date of Patent: Jan. 23, 2007

(54) BELL-TYPE NOZZLE BLOW-MOLDING INSTALLATION

(75) Inventors: Didier Santais, Octeville-sur-Mer (FR); Stéphane Legallais, Octeville-sur-Mer (FR)

(73) Assignee: Sidel (FR)

( * ) Notice: Subject to any disclaimer, the term of this patent is extended or adjusted under 35 U.S.C. 154(b) by 54 days.

(21) Appl. No.: 10/539,578

(22) PCT Filed: Nov. 24, 2003

(86) PCT No.: PCT/FR03/03471

§ 371 (c)(1),
(2), (4) Date: Jun. 17, 2005

(87) PCT Pub. No.: WO2004/065104

PCT Pub. Date: Aug. 5, 2004

(65) Prior Publication Data

US 2006/0115546 A1    Jun. 1, 2006

(30) Foreign Application Priority Data

Dec. 19, 2002   (FR) .................................. 02 16175

(51) Int. Cl.
*B29C 49/58* (2006.01)

(52) U.S. Cl. .......................... 425/3; 425/535
(58) Field of Classification Search .............. 425/3, 425/535, 541; 65/261, 300
See application file for complete search history.

(56) References Cited

U.S. PATENT DOCUMENTS

| | | | |
|---|---|---|---|
| 3,871,856 A * | 3/1975 | Trahan | ......................... 65/261 |
| 4,214,860 A | 7/1980 | Kleimenhagen et al. | |
| 6,464,486 B1 | 10/2002 | Barray et al. | |
| 6,722,868 B1 * | 4/2004 | Evrard | ......................... 425/3 |
| 7,004,745 B2 * | 2/2006 | Galloni | ....................... 425/535 |

FOREIGN PATENT DOCUMENTS

| | | |
|---|---|---|
| DE | 100 63 553 A | 7/2002 |
| FR | 2 662 631 A | 12/1991 |
| FR | 2 790 704 A | 9/2000 |
| WO | WO 02/24435 A | 3/2002 |

* cited by examiner

*Primary Examiner*—Robert B. Davis
(74) *Attorney, Agent, or Firm*—Sughrue Mion, PLLC

(57) ABSTRACT

A blow-molding installation for manufacturing receptacles from blanks of thermoplastic polymer, said installation comprising a bell-nozzle for blowing a fluid under pressure into a blank (3) disposed in a cavity (2) of a mold (1), the end of the nozzle being in the shape of a bell (11) which is suitable, during blow-molding, for being pressed into leak-tight end-to-end abutment against a wall (F) of the mold while capping the neck (7) of the blank that emerges from said wall; said installation further comprises means (16₁) for securing the nozzle to the wall of the mold by mutual attraction, which means can be activated, after the nozzle has been brought into end-to-end contact with the wall (F) of the mold without flattening a sealing gasket (13), so as to attract the nozzle (10) and the wall (F) towards each other with an attraction force greater than the repulsion force due to the pressure of the blow-molding fluid.

11 Claims, 5 Drawing Sheets

BELL-TYPE NOZZLE BLOW-MOLDING INSTALLATION

FIELD OF THE INVENTION

The present invention relates to improvements made to blow molding installations, or to stretch-blow molding installations that implement a special nozzle referred to as a "bell-nozzle" and that are for manufacturing receptacles from roughs or blanks of thermoplastic polymer, in particular polyethylene terephthalate (PET), such an installation comprising a blow nozzle of the bell-nozzle type for blowing a fluid under pressure into a blank disposed in a cavity of a mold, said nozzle having its end in the shape of a bell which is suitable, during blow-molding, for being pressed into leaktight end-to-end abutment against a wall of the mold while capping the neck of the blank that emerges from said wall against which said blank is in abutment via an annular collar while its body is engaged in said cavity of the mold.

DESCRIPTION OF THE PRIOR ART

A bell-nozzle blow-molding installation is described in document FR-A-2 764 544. In that known arrangement, as is shown in particular in FIGS. 1 and 2 of that document, the bell-shaped end portion of the nozzle is supported at the end of an elongate tubular body having a portion of increased diameter that forms a piston slidably received axially in a stationary cylinder provided with end orifices for constituting feeds and discharges for a drive fluid. By means of that pneumatic drive, the bell of the nozzle can be brought into leaktight end-to-end contact against the wall of the mold for the purpose of performing the blow-molding operation, or after said operation, be moved in the opposite direction so as to bring it away from the mold.

Document FR-A-2 790 704 describes a bell-nozzle blow-molding installation in which the nozzle is moved by toggle mechanical means driven by a side pneumatic actuator.

In both of those cases, the bell of the nozzle must be applied against the mold with a force greater than the repulsion force generated by the pressure of the blow-molding pressure (e.g. typically about $40 \times 10^5$ pascals (Pa)). As a result, the support of the mold and the support of the nozzle are subjected to very large reaction forces whose influence is felt even more acutely since those supports are generally cantilevered out or have cantilevered-out portions; in particular it is usual for the nozzle to be supported by a transverse arm supported via one of its ends.

The structural arrangements and the operating conditions of those known blow-molding installations lead to the support members being reinforced, which results in increased weights and higher inertias for the moving parts, going against what is necessary for allowing the operating speeds of the machines to be increased as is desired by users.

SUMMARY OF THE INVENTION

An object of the invention is thus to propose an improved arrangement for blow-molding machines equipped with bell-nozzles so that they are able to withstand operating throughputs that are high, or even that are higher than those currently used, while also making provision, as far as possible, to simplify the structure of the machine, in particular as regards the blow nozzle and the means for actuating it.

To these ends, a bell-nozzle blow-molding installation as mentioned in the introduction is characterized, as arranged in accordance with the invention, in that it further comprises means for securing the nozzle to said wall of the mold by releasable mutual attraction, which means can be activated, after the nozzle has been brought into end-to-end contact with said wall of the mold without flattening a sealing gasket, so as to attract the nozzle and said wall towards each other with an attraction force greater than the repulsion force due to the pressure of the blow-molding fluid.

By means of the provisions specific to the invention, it is only between the co-operating elements (wall of the mold/nozzle) that the securing force is exerted, and said elements are attracted towards each other by implementing suitable means. In such an arrangement, the respective supports for supporting the mold and for supporting the nozzle are no longer subjected to high reaction forces as they are in prior devices. Since they only have to perform their support functions, the respective supports for the mold and for the nozzle need to be dimensioned only for performing said support functions: they can thus be made in forms that are lighter in weight than the prior structures, thereby reducing their weights and thus significantly reducing their inertias, which is very advantageous for allowing higher operating speeds to be achieved.

Various types of embodiment are possible for such means for securing by mutual attraction.

Thus, it is possible to implement mechanical means. For example, such mechanical means for securing by mutual attraction may comprise at least one device for securing by fastening the nozzle to said mold wall, which device comprises firstly at least one bar secured to said wall of the mold and secondly at least one curved finger pivotally supported by the bell of the nozzle, said finger being of varying curvature and being suitable for being engaged under said bar with a force being generated that urges the nozzle and the wall of the mold towards each other. A plurality of devices of this type (e.g. two) may be implemented, uniformly distributed over the peripheries of the mold and of bell-nozzle.

Thus also, the means for securing by mutual attraction may be fluid means suitable for generating suction at the surface of the wall of the mold facing the end wall of the bell of the nozzle. For example, in view of the technological context of the installation whose controls are essentially of the pneumatic type, it is advantageous for the fluid means for securing by mutual attraction to be pneumatic means which comprise an annular groove formed in the wall of the mold and in which at least one channel opens out in communication with means for generating suction, said annular groove having a diameter substantially equal to the diameter of the end wall of the bell of the nozzle that is situated facing it.

Thus also, the means for securing by mutual attraction may be magnetic means. In practical manner, the magnetic means for securing by mutual attraction may comprise at least one magnetic device carried by the nozzle, said magnetic device having selective control means for establishing or interrupting the magnetic flux, and a zone made of a ferromagnetic material provided on said wall of the mold facing the nozzle. Admittedly, it is then possible to make provision for the magnetic device to comprise at least one permanent magnet supported by the nozzle and a moving magnetic screen associated functionally with said magnet for allowing the magnetic flux from said magnet to pass or for interrupting said magnetic flux. However, if it is desired to avoid having to use moving parts that can suffer from operating times that are too long in regard to the desired high operating speeds, it is possible to use a magnetic device having a permanent magnet equipped with an electrical control suitable for acting, when it is excited, to generate magnetic flux that is approximately of the same magnitude and of direction opposite to the direction of the magnetic flux of the permanent magnet. A plurality of magnetic devices may preferably be distributed around the peripheries of the mold and of the nozzle.

Thus also, finally, in preferred manner, the means for securing by mutual attraction may be electromagnetic means which comprise at least one electromagnet device having a coil associated with a core that are supported by the nozzle and that are suitable for co-operating functionally with the wall of the mold or a portion of said wall that is made of a ferromagnetic material. Although it is possible to consider implementing a plurality of electromagnet devices distributed around the peripheries of the mold and of the nozzle, it is however simpler and less constraining, in terms of weight and of overall size, to use a single electromagnet device of annular shape mounted coaxially in the bell end of the nozzle.

It is common, in nozzle blow-molding installations concerned by the invention, for the mold to be equipped with a removable neck plate that is secured to said wall of the mold, and it is against said neck plate that the bell of the nozzle comes into leaktight end-to-end abutment. Such a steel neck plate is used in particular with molds made of aluminum alloy, so as to reduce the wear due to contact with the bell of the nozzle, so as to ensure the surface abutting against the nozzle is smoother and longer-lasting and favorable to providing sealing of good-quality, and, by using interchangeable neck plates having central orifices of various dimensions, so as to facilitate the use of the mold for manufacturing receptacles provided with necks of various diameters. In which case, advantage is taken from the presence of the neck plate to make it include the mold portion of the means for securing by mutual attraction. In particular, it is easy to equip the neck plate so that it is provided with the groove of the above-mentioned pneumatic means, and, above all, it is easy to make the neck plate from a ferromagnetic material that is suitable when implementing the above-mentioned magnetic or electromagnetic means.

BRIEF DESCRIPTION OF THE DRAWINGS

The invention will be better understood on reading the following detailed description of certain embodiments given merely by way of non-limiting example. In the description, reference is given to the accompanying drawings, in which.

DETAILED DESCRIPTION OF THE INVENTION

Figure 1:
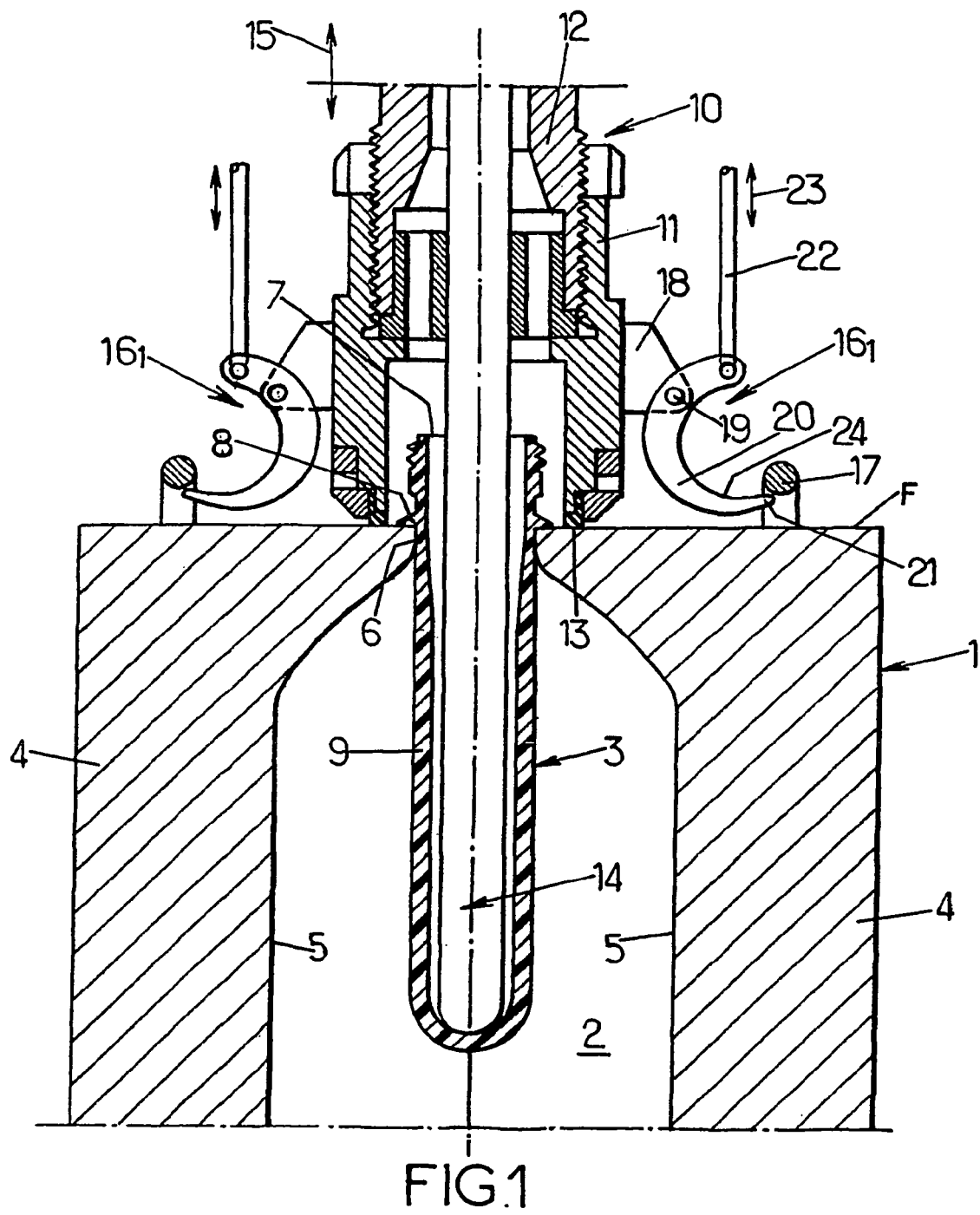
FIG. 1 is a fragmentary section view of a mold and of a nozzle equipped with mechanical fastening means making it possible for securing to be achieved by mutual attraction.

In the various figures of the accompanying drawings, only the co-operating portions of the mold and of the blow nozzle that are necessary for understanding the invention are shown. In the figures, like elements or portions are designated by like reference numerals.

With reference firstly to FIG. 1, a mold 1 has a mold cavity 2 that has the same shape as a receptacle to be obtained by deforming a rough or blank (e.g. a preform) 3. In particular the mold is of the hinged type or bill-fold type. In which case, the mold 1 comprises two half-molds 4 provided with respective cavity-forming recesses 5 which, when brought together (when the mold is closed) define the mold cavity 2, or most of said cavity when the mold is further provided with a complementary part provided with the cavity-forming recess for the bottom of the receptacle.

The mold 2 has an external wall F (top wall in FIG. 1) in which the mold cavity 2 opens out via a passageway 6 (neck passageway) via which the blank 3 is engaged. The neck 7 of the blank 3 has its final shape and its final dimensions, and it bears via an annular collar 8 against the wall F of the mold. Only the body 9 of the blank 3 extends inside the mold cavity 2.

As regards the blow means, only the end portion of the blow nozzle 10 is shown. The bell-shaped end portion 11 is supported by a tubular body 12 serving to feed in the fluid under pressure. The annular end wall of the bell 11 is equipped with an annular sealing gasket 13. The bell 11 is shaped and dimensioned so that, when it is brought into end-to-end abutment against the wall F of the mold, it caps the neck 7 of the blank projecting above said wall F.

The support means (not shown) for supporting the nozzle 10 are arranged to make it possible for the nozzle to move axially in both directions (arrow 15) so as to bring said nozzle against the mold for the blow-molding operation or so as to move it away therefrom for loading/unloading the mold.

FIG. 1 also shows a draw rod 14 that is engaged coaxially through the tubular body 12 of the bell 11 and that extends to the point of touching the inside of the bottom of the blank 3 so that, by being moved axially towards the bottom of the mold, it mechanically draws the body of the blank 3 at the same time as said body is being expanded pneumatically during the blow-molding process.

The details of how the blow nozzle is arranged and of how it operates are described and shown in Document FR-A-2 764 544.

In the prior arrangements, it is the support means for supporting the nozzle 10 that push the nozzle 10 against the wall F of the mold with a force greater than the repulsion force generated, during blow-molding, by the very high (e.g. typically about $40 \times 10^5$ Pa) pressure of the blow-molding fluid (in general air) that is present in the chamber defined by the bell 11 closed by the wall F. The thrust force developed by the support means of the nozzle generates reaction forces both on the support of the mold and on the support of the nozzle, which reaction forces are even more problematic mechanically since said supports are generally cantilevered out and are therefore overdimensioned.

In order to avoid these drawbacks, the invention thus proposes to replace the thrust force whereby the nozzle is pushed against the wall F of the mold with a mutual attraction force whereby the nozzle (more precisely the bell 11 of the nozzle) and the wall F of the mold are mutually attracted, so that there are then no reaction forces at the supports, and said supports can then be lighter in weight.

Under these conditions, the support means of the nozzle 10, which support means move the nozzle axially in both directions 15 merely have to bring the end face of the bell 11 into contact with the wall F, without flattening the gasket 13 (position shown in FIG. 1). It is then the means for securing by mutual attraction that are provided on the wall F and/or on the nozzle 10, and in particular on the bell 11 thereof, that put the bell 11 into end-to-end leaktight abutment against the wall F with an attraction force greater than the repulsion force of the blow-molding fluid.

The means for securing by mutual attraction can be of any desirable type suitable for the function to be provided, in particular as regards mechanical resistance to the high repulsion force that tends to push the bell 11 away, and as regards the speed of operation in the context of high production throughput.

The means for securing by mutual attraction can be mechanical means $16_1$, one possible embodiment of which is shown in FIG. 1. In order to clamp the bell 11 uniformly over its entire periphery, a plurality of mechanical means $16_1$ can be provided, each of which is constituted by a mechanical clamping device, which means are distributed peripherally (two diametrically opposite ones are shown in FIG. 1).

Each clamping device $16_1$ comprises a bar 17 secured to the wall F of the mold. The bar 17 can project relative to the wall F as shown in FIG. 1, or else be set back into a recess provided in the wall F.

On the outside wall of the bell 11, a projecting yoke 18 supports a curved finger 20 which is received to pivot freely on a pivot 19 and which has its free end 21 facing the bar 17 and positioned immediately therebelow, as shown in FIG. 1, when the clamping device is not active.

At its opposite end situated on the other side of the pivot 19, the curved finger 20 is hinged to the end of a drive rod 22 which is driven approximately parallel to the axis of the nozzle (double-headed arrow 23) by control means (not shown).

By giving the bottom edge 24 of the finger 20 a suitable curvature of gradually decreasing radius, moving the rod 22 upwards causes the curved finger 20 to engage under the bar 17 and, by means of moving contact of the edge 24 of the finger against the underside of the bar 17, powerful mechanical clamping is obtained whereby the bell 11 of the nozzle is clamped powerfully against the wall F of the mold.

Figure 2:
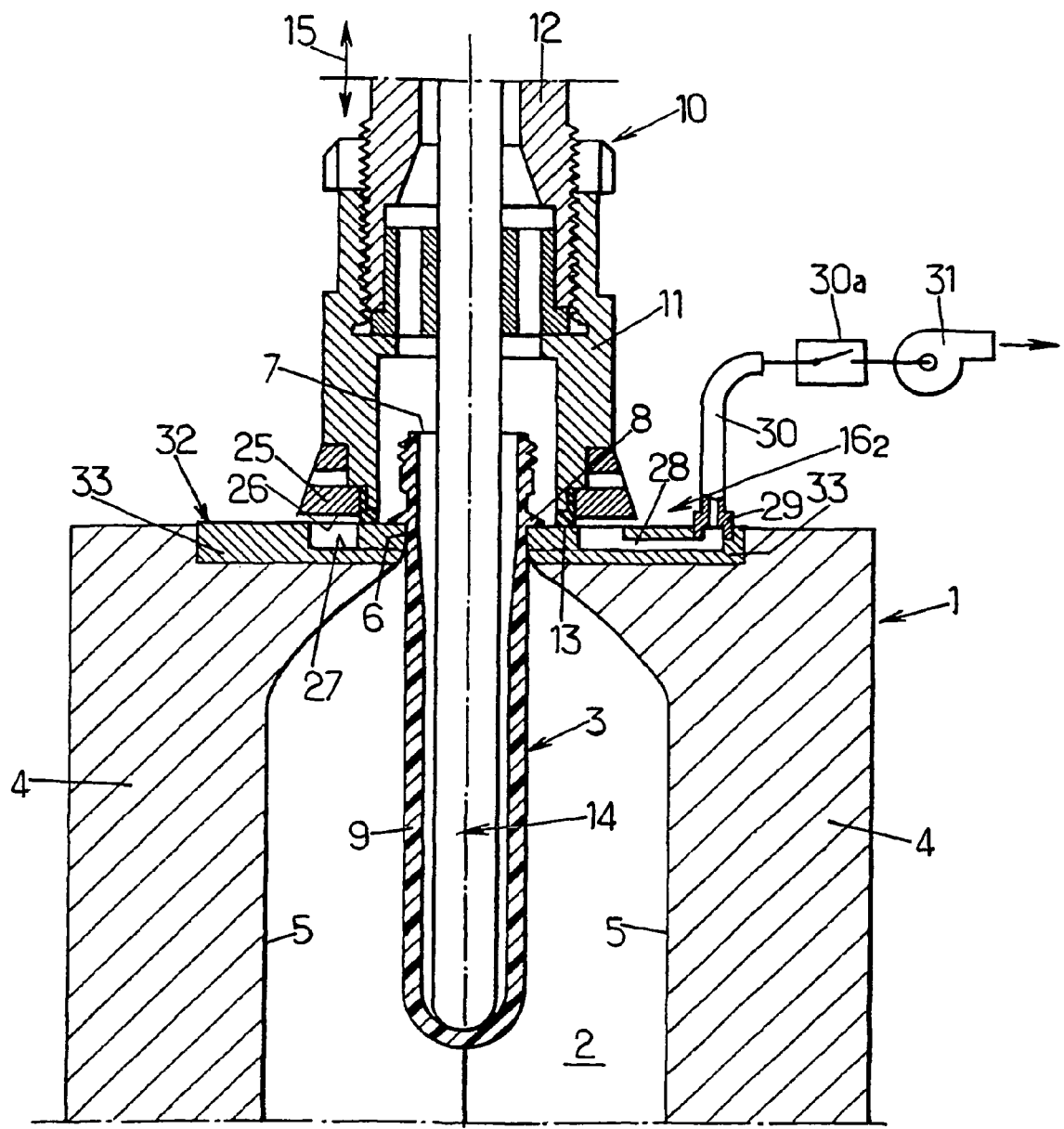
FIG. 2 is a fragmentary section view of a mold provided with a neck plate and of a nozzle that are provided with pneumatic means for securing by mutual attraction.

The means for securing by mutual attraction can also be suction pneumatic means $16_2$, a possible embodiment of which is shown in FIG. 2.

At its base, the bell 11 is provided with an annular ring 25 that is shaped in a manner such as to have a wider end face 26.

The mold 1 is provided with an annular groove 27 set back into its wall F concentrically relative to the neck passageway 6. The groove 27 is dimensioned such that it extends facing said wider end face 26 of the annular ring 25 of the bell 11, and it has a width slightly smaller than the width of said end face 26.

Starting from the groove 27, at least one channel 28 extends that is set back into the mold 1 and that opens out in a wall of the mold, e.g. the wall F, via a coupling 29 to which a duct 30 is connected for linking to a suction pump 31.

When the bell 11 is brought into the immediate vicinity of the wall F, connecting (at 30a, e.g. via an electrically-controlled, electro-pneumatically controlled, or magnetically controlled connection) the duct 30 to the suction pump 31 establishes a vacuum in the groove 27 that is suitable for attracting the bell 11, with the end face 26 covering the opening in the groove in leaktight manner. The attraction force whereby the bell 11 of the nozzle 10 is attracted against the wall F of the mold 1 depends on the area of mutual contact between the groove 27 and the end face 26, i.e. on the diameter and on the width of the groove and on the magnitude of the suction generated by the pump 31.

In order to avoid having to form the groove 27 and the channel 28 directly in the thickness of the mold 1, it is advantageously possible to make provision for them to be implemented in combination with a neck plate 32 of the type commonly used in this type of mold having bell-nozzle blow means, in order to enable the bell to bed down in more stable and more leaktight manner, and in order to enable receptacles having various neck diameters to be manufactured without modifying the mold itself. In the mold considered herein, the neck plate 32 is made up of two half-plates 33 removably set into respective ones of two countersunk portions provided in respective ones of the two half molds 4. The groove 27 and the channel 28 are then formed in the two neck half-plates 31.

Figure 3:
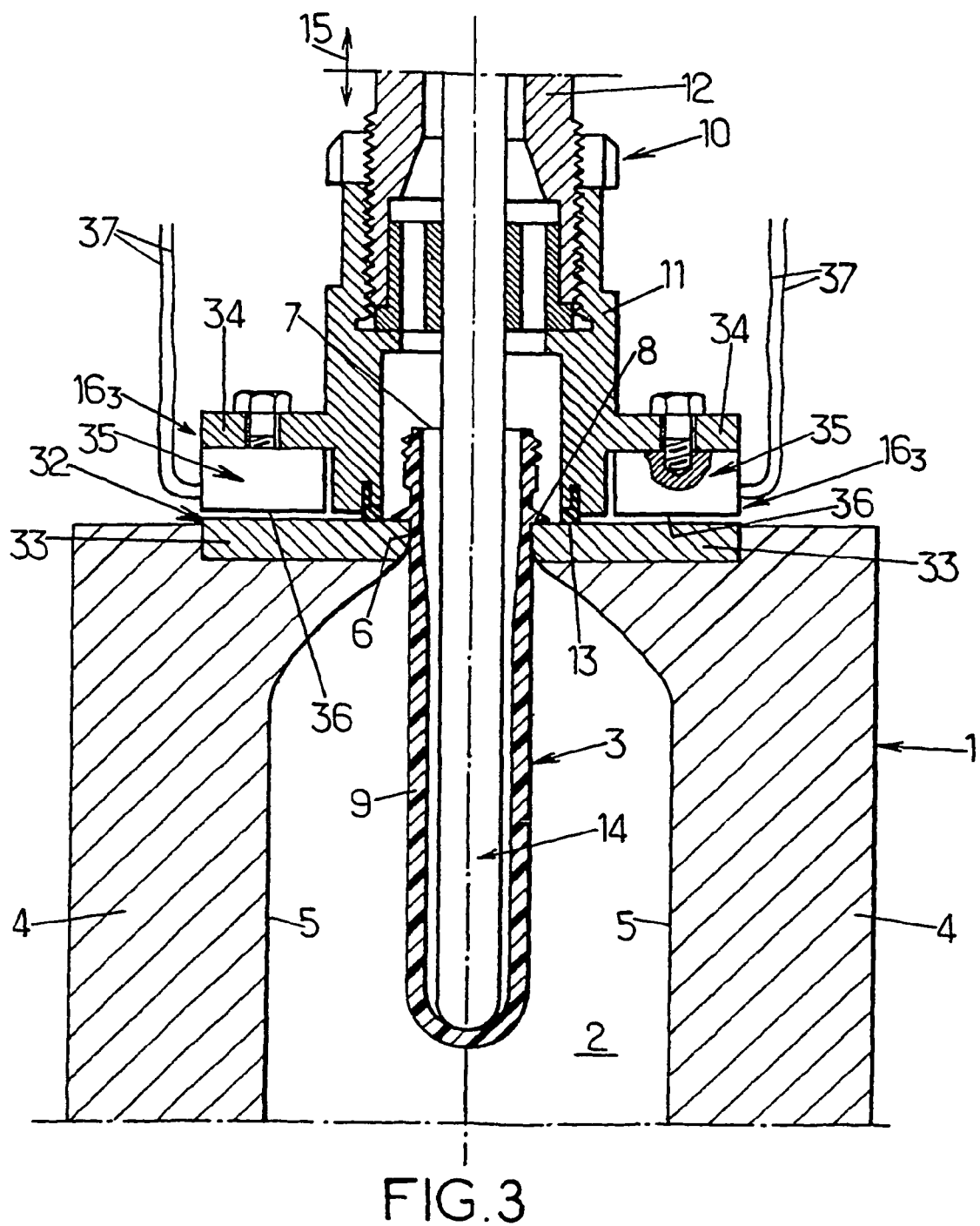
FIGS. 3 and 5 are fragmentary section views of a mold provided with a neck plate and of a nozzle that are provided with permanent-magnet magnetic means for securing by mutual attraction with, respectively, an electrical control and a moving-screen mechanical control.

The means for securing by mutual attraction can also be magnetic means $16_3$, one possible embodiment of which is shown in FIG. 3.

The bell 11 supports, e.g. by means of radially-projecting tabs 34, magnetic devices or "magnetic suction cups" 35 that can, as shown, be electrically controlled, such as those available commercially under the reference 01320 from Binder Magnetic. Each of these magnetic devices 35 comprises a permanent magnet generating a magnetic field between the central pole and the periphery of the holding surface 36. The device further comprises a switch-off coil (not shown) connected via wires 37 to a DC voltage source, which coil, when it is excited, generates a magnetic field of poles opposite to the poles of the permanent magnet, which field substantially neutralizes the magnetic field of the permanent magnet.

By means of such magnetic means $16_3$ having magnetic suction cup devices that are electrically controlled, and of which, for example, a plurality (two, three or four) are disposed over the periphery of the bell, it is possible to secure the bell 11 of the nozzle 10 to the mold 1 by mutual attraction and in releasable manner.

In order to close the magnetic circuit when the mold 1 is made of a non-magnetic metal (e.g. of aluminum or of an aluminum alloy), it is possible to provide a neck plate 32 as mentioned above for the preceding embodiment, the neck plate 32 being made of steel.

Figure 4:
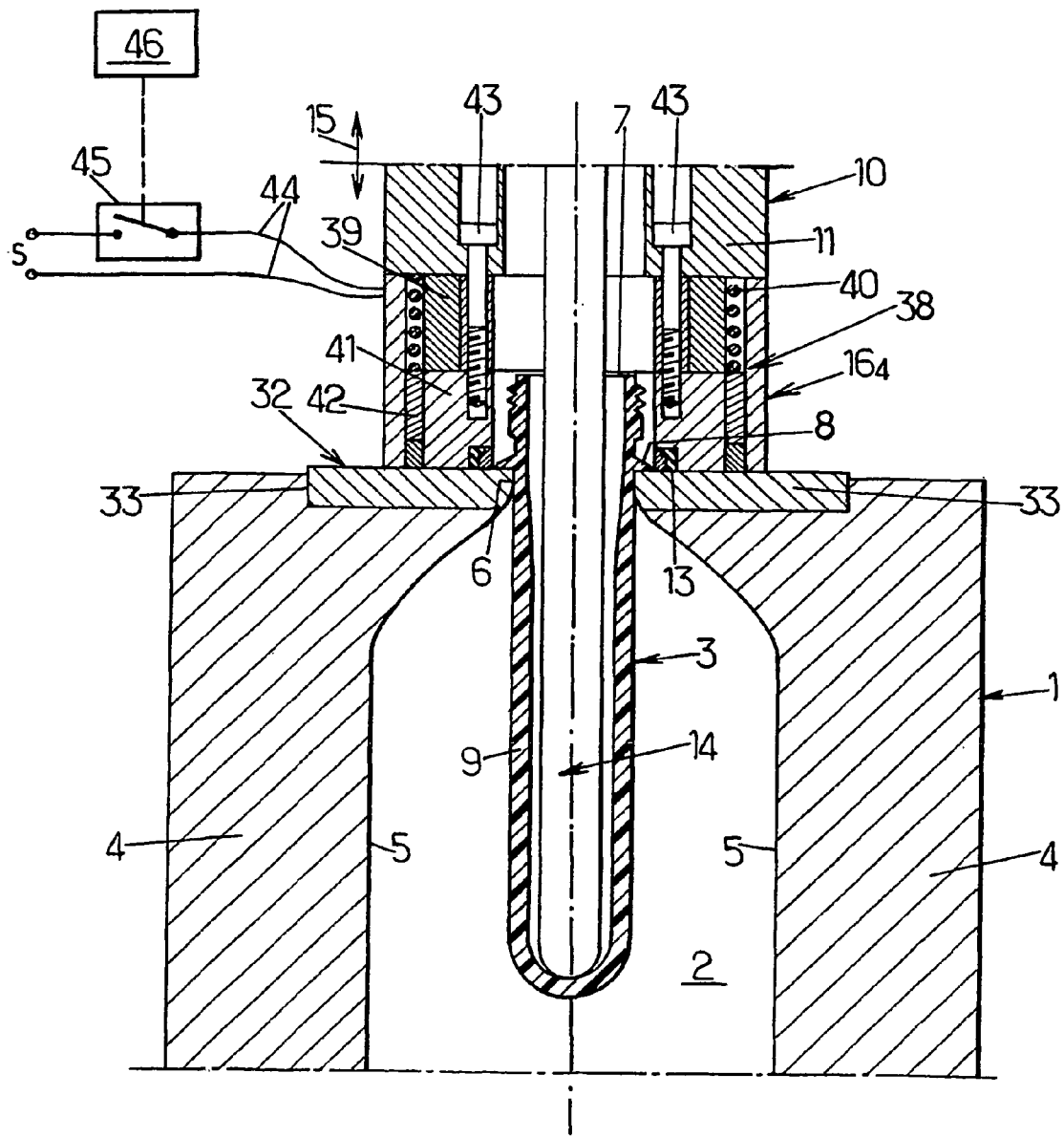
FIG. 4 is a fragmentary section view of a mold provided with a neck plate and of a nozzle that are provided with electromagnetic means for securing by mutual attraction.
Figure 5:
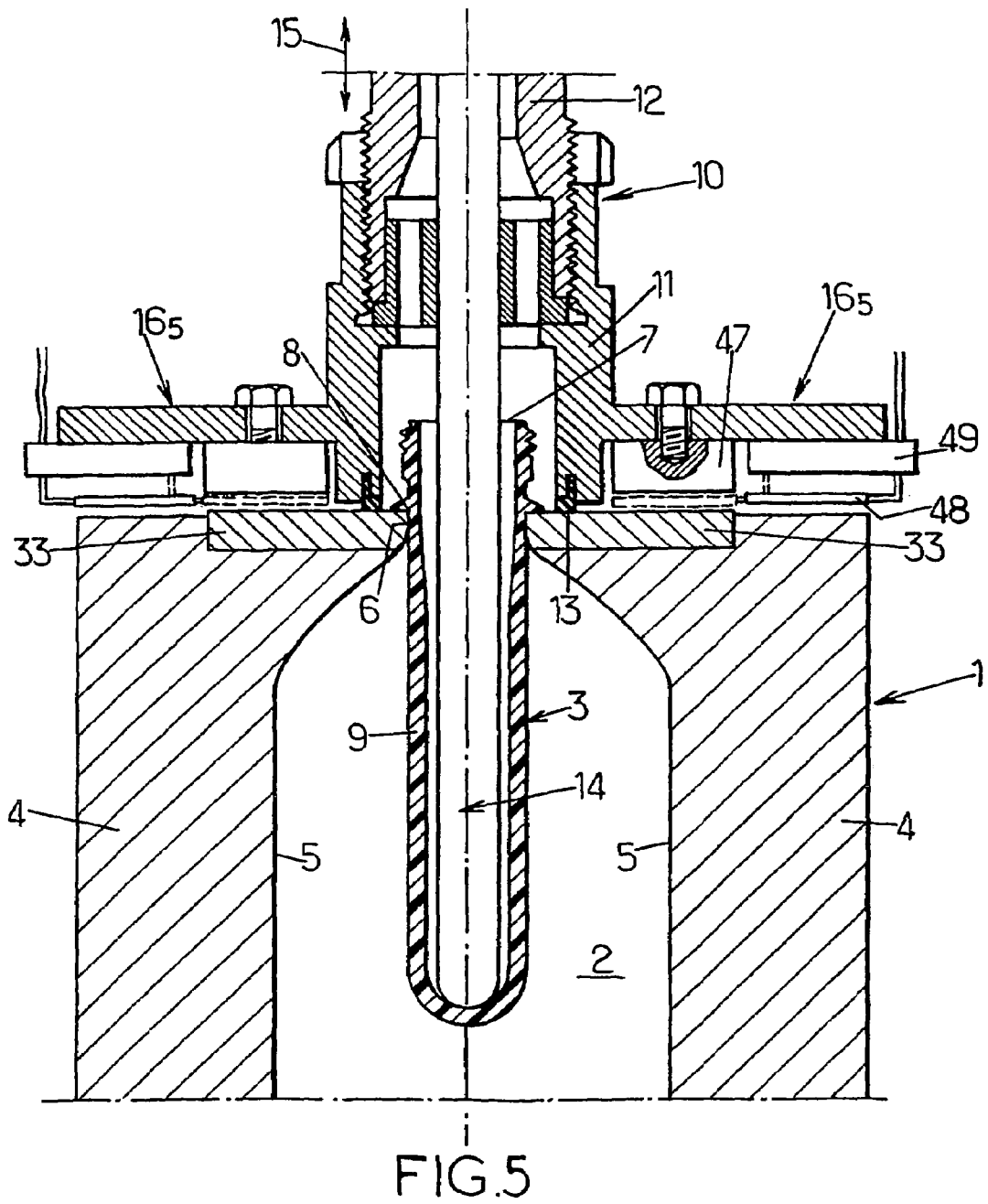

In a manner that is preferred for reasons of simplicity of implementation and of suitability for operation at high throughput, the means for securing by mutual attraction can also be electromagnetic means $16_4$, one possible embodiment of which is shown in FIG. 4.

The electromagnetic means $16_4$ shown are constituted by an electromagnetic suction cup 38 of annular structure that is integrated coaxially into the end of the bell 11, which end is arranged in the form of an annular skirt and made of a non-magnetic material. The electromagnetic suction cup 38 comprises an annular magnetic 39, e.g. made of an aluminum—nickel—cobalt alloy (AlNiCo), surrounded by a coil 40. In front of the magnet surrounded by its coil, a core 41 made of steel is disposed that is surrounded by a ring 42, e.g. made of a neodymium—iron—boron (NdFeB) alloy. In the end face of the steel core 41, the annular sealing gasket 13 is supported by any suitable means. All of the component parts can be assembled in the bell 11 by means of bolts 43.

Implementing such an electromagnetic suction cup 38 is particularly advantageous when the mold 1 is equipped with a neck plate 32 in the manner explained above, said neck plate then being made of a ferromagnetic material, in particular of steel.

For exciting the coil 40, said coil is connected via wires 44 to an electrical power source S via a switch 45 with which a control device 46 is functionally associated.

The advantage of this solution lies in the absence of moving parts: it is thus possible, without any significant problem, to obtain high-throughput operation which is increasingly required by users.

Also in the context of implementing magnetic means, it is possible to consider using magnetic means 165 comprising magnets 47 that can be masked by screens 48 which can be moved by a suitable drive member 49 as shown in FIG. 4.

It can be understood that each of the types—mechanical, pneumatic, magnetic, electromagnetic—of securing means described and shown above is given merely by way of example, and that, for each type, other solutions can be implemented while remaining within the ambit of the invention. Each securing device that is described above—regardless of whether it is of the mechanical, fluid, magnetic, or electromagnetic type—includes control means that can be of any design that is desirable, in particular with regard to the controls used in the remainder of the installation: mechanical means (in particular a cam/wheel system that is very common in these installations) or electropneumatic means, or electrical means (in association with a management unit for managing the installation as a whole).

The invention claimed is:

1. A blow molding or stretch-blow molding installation for manufacturing receptacles from blanks of thermoplastic polymer, in particular polyethylene terephthalate (PET), said installation comprising a blow nozzle of the bell-nozzle type for blowing a fluid under pressure into a blank disposed in a cavity of a mold, said nozzle having its end in the shape of a bell which is suitable, during blow-molding, for being pressed into leaktight end-to-end abutment against a wall of the mold while capping the neck of the blank that emerges from said wall against which said blank is in abutment via an annular collar while its body is engaged in said cavity of the mold;

wherein said installation comprises means for securing the nozzle to said wall of the mold by releasable mutual attraction, which means can be activated, after the nozzle has been brought into end-to-end contact with said wall of the mold without flattening a sealing gasket, so as to attract the nozzle and said wall towards each other with an attraction force greater than the repulsion force due to the pressure of the blow-molding fluid.

2. A blow-molding installation according to claim 1, wherein the means for securing by mutual attraction are mechanical means.

3. A blow-molding installation according to claim 2, wherein the mechanical means for securing by mutual attraction comprise at least one device for securing by fastening the nozzle to said mold wall, which device comprises firstly at least one bar secured to said wall of the mold and secondly at least one curved finger pivotally supported by the bell of the nozzle, said finger being of varying curvature and being suitable for being engaged under said bar with a force being generated that urges the nozzle and the wall of the mold towards each other.

4. A blow-molding installation according to claim 1, wherein the means for securing by mutual attraction are fluid means suitable for generating suction at the surface of the wall of the mold facing the end wall of the bell of the nozzle.

5. A blow-molding installation according to claim 4, wherein the fluid means for securing by mutual attraction are pneumatic means which comprise an annular groove formed in the wall of the mold and in which at least one channel opens out in communication with means for generating suction, said annular groove having a diameter substantially equal to the diameter of the end wall of the bell of the nozzle that is situated facing it.

6. A blow-molding installation according to claim 1, wherein the means for securing by mutual attraction are magnetic means.

7. A blow-molding installation according to claim 6, wherein the magnetic means for securing by mutual attraction comprise at least one magnetic device carried by the nozzle, said magnetic device having selective control means for establishing or interrupting the magnetic flux, and a zone made of a ferromagnetic material provided on said wall of the mold facing the nozzle.

8. A blow-molding installation according to claim 7, wherein the magnetic device comprises at least one permanent magnet supported by the nozzle and a moving magnetic screen associated functionally with said magnet for allowing the magnetic flux from said magnet to pass or for interrupting said magnetic flux.

9. A blow-molding installation according to claim 7, wherein the magnetic device comprises at least one permanent magnet supported by the nozzle and an electrical control associated functionally with said magnet and suitable for acting, when it is excited, to generate magnetic flux substantially canceling out the magnetic flux from the magnet.

10. A blow-molding installation according to claim 1, wherein the means for securing by mutual attraction are electromagnetic means which comprise at least one electromagnet supported by the nozzle and which are suitable for co-operating functionally with the wall of the mold or a portion of said wall that is made of a ferromagnetic material, in particular steel.

11. A blow-molding installation according to claim 1, wherein the mold is equipped with a removable neck plate that is secured to said wall of the mold, and wherein, on the mold, the means for securing by mutual attraction are provided in said neck plate.

\* \* \* \* \*